July 4, 1967 L. J. CREMER, JR 3,329,809
HIGH BEAM INDICATOR
Filed April 30, 1965
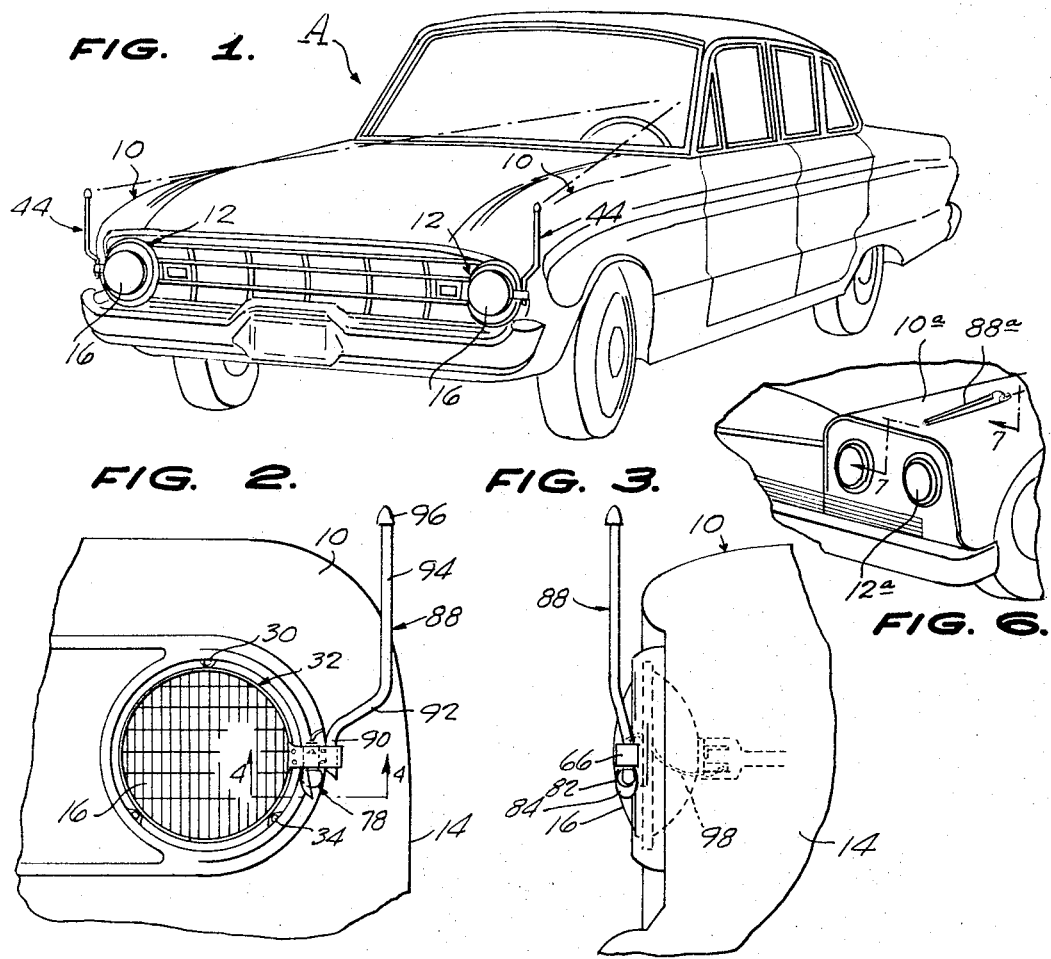
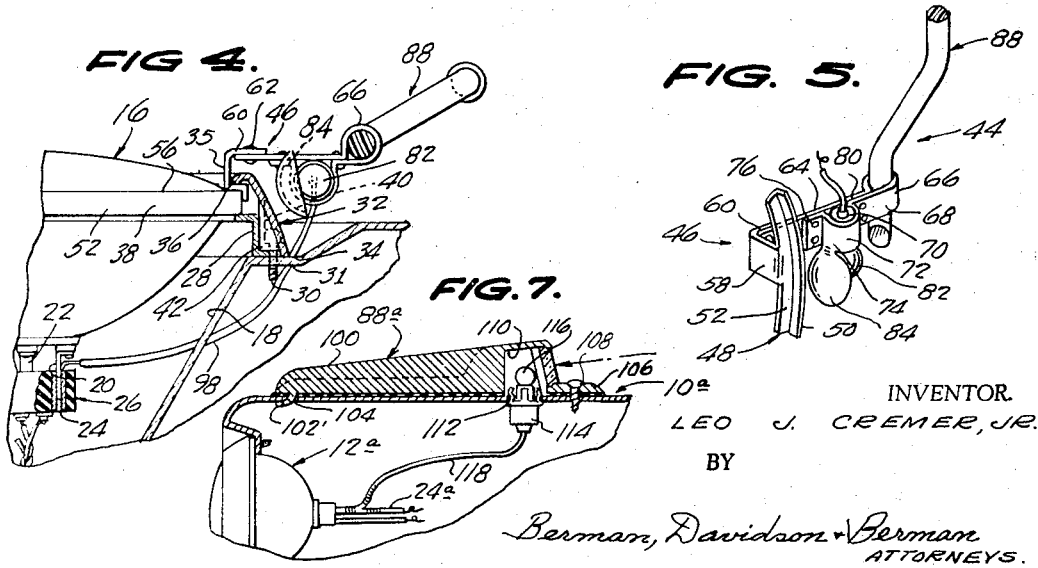
INVENTOR.
LEO J. CREMER, JR.
BY
Berman, Davidson & Berman
ATTORNEYS.

United States Patent Office 3,329,809
Patented July 4, 1967

3,329,809
HIGH BEAM INDICATOR
Leo J. Cremer, Jr., Melville, Mont. 59055
Filed Apr. 30, 1965, Ser. No. 452,255
6 Claims. (Cl. 240—8.4)

ABSTRACT OF THE DISCLOSURE

Devices serving the dual functions of vehicle fender guides and headlight bulb condition indicators, the devices comprising end lighted components mounted on the fenders, adjacent to headlights, electric bulbs in lighting relation to the components, the indicator bulbs being in circuit with the filaments of the headlight bulbs, so as to cause the end lighted components to show, by being unlighted or lighted, the condition of the headlight bulbs, to the driver of a vehicle, one form of the devices including a reflector which serves to concentrate light from an indicator bulb onto the light receiving end of the associated end lighted component, light emitted by the headlight being in no instance causative of lighting of the associated end lighted component.

This invention relates to a high beam indicator for vehicle headlights, and more particularly to a headlight mounted indicator of this kind, which is adapted to serve also as a luminous fender guide.

The common practice of providing, as the sole indicator of a high beam condition of the headlights of a vehicle, a relatively small and not always readily located light on the instrument panel of the vehicle requires that the driver, in order to check the high condition while driving at night, remove his eyes from the road and refocus and redirect his attention, instead, toward locating and reading the instrument panel mounted light followed by refocus of attention to the road. This focusing, refocusing, and direction and redirection of attention to the business of driving subjects the driver and the drivers of other cars is subject to the peril of accident ranging from minor to fatal. Further, should the instrument panel indicator light fail, for any reason, the driver is in no position to know, for certain, that his headlights are or are not on high beam, thereby likely subjecting on-coming drivers to dangerous blinding by a high beam condition of his headlights, a prolific cause of highway accidents.

The primary object of the invention is the provision of a headlight mounted indicator, which eliminates the above outlined undesirable and unsafe conditions, by giving constant, highly visible and unmistakably clear indication, in the normal line of sight of the driver of a vehicle, of a high beam or a low beam condition of a headlight on the vehicle he is driving, the said indicator deriving illumination from the headlight.

Another object of the invention is the provision of a device of the character indicated above, which affords equally positive indication of the fact when the high beam element of the lamp of the headlight concerned has failed, such indication being afforded by an unlit condition of the indicator.

A further object of the invention is the provision of an indicator, of the character indicated above, which has a portion thereof laterally offset to the outboard side of the fender, on which the headlight concerned is located, so as to serve as a fender guide, showing the clearance available between the fender and any object or objects located close to the side of the fender.

In the drawings:

FIGURE 1 is a front perspective view of an automobile showing devices of the present invention installed on its high-low beam headlights;

FIGURE 2 is an enlarged fragmentary front elevation of the left front fender, headlight, and high beam indicator of said automobile;

FIGURE 3 is a fragmentary outboard side elevation of FIGURE 2;

FIGURE 4 is a further enlarged fragmentary horizontal section, taken on the line 4—4 of FIGURE 2;

FIGURE 5 is a perspective view of the indicator, per se;

FIGURE 6 is a fragmentary perspective view of another embodiment of the invention; and FIGURE 7 is a fragmentary vertical section taken on the line 7—7 of FIGURE 6.

Referring in detail to the drawings, A generally designates an automobile having left- and right-hand fenders 10, in the fore-parts of which are mounted high-low beam headlights 12, spaced inwardly from the outboard sides 14 of the fenders.

The headlights 12, as shown in FIGURE 4 comprise sealed beam lamps 16, which are inset in wells 18 and have high and low beam terminals 20 and 22, respectively, plugged into contacts, including high beam contacts 24 for its high beam terminals 20, in insulated plugs 26. The lamps 16 are set in the openings of mounting rings 28 which are perforated to pass screws 30, which thread into flat portions 31 of the wells which surround the lamps. The rings 28 are enclosed by headlight rims 32 which have outer edges 34 which bear upon the well portions 31, and, on their inner edges have hook flanges 35 whose terminal edges 36 normally bear upon front surfaces of the peripheral flanges 38 of the lamps. The headlight rims 32 are formed, at circumferentially spaced intervals, with depressions 40, whose flat bottom walls 42 bear upon the mounting rings, and are traversed by the screws 30 which hold the headlight rims in place. The foregoing structure is conventional and constitutes no part of the present invention, except in combination therewith.

The illustrated indicator 44 are similar in construction, but reversed, for left-hand and right-hand installation, and each comprises a bracket 46 which has an arcuate crosshead 48, corresponding in curvature to that of the peripheral flange 38 of the related seal-beam lamp 16. The crosshead is L-shaped in cross section to provide a relatively narrow flange 50, adapted to bear against the peripheral surface 52 of the lamp flange 38, and a wider flange 52, adapted to bear against the front surface 56 of the flange.

The crosshead flange 52 is connected, at its midlength point to the outer end of a right-angularly related flat bar 58, which extends forwardly from the crosshead and terminates in a laterally extending ear 60, which is fixed, as by means of a rivet 62, to the front surface and the laterally inward end of an elongated flat carrier bar 64.

The carrier bar 64 merges, at its laterally outward end, into a clamp loop 66, whose rear flight 68 extends inwardly and is secured to the rear side of the bracket, as by means of rivets 70. The rear flight 68 merges, at its inward end, into a semicylindrical holder 72. The holder 72 terminates, at its inward end, in a flange 74, which is secured to the rear side of the carrier bar 64, as by means of rivets 76.

A small electric lamp 78 has its cylindrical body 80 engaged upwardly in and suitably secured in the holder 72, with its bulb 82 extending below the holder. On the inboard side of the holder 72 and extending downwardly behind the bulb 82 is a generally circular concave-convex reflector 84. As shown in FIGURE 4, the reflector 84 is angled slightly forwardly and laterally outwardly to reflect light from the bulb 82, to the adjacent end of a perpendicular, preferably plastic material end-lighted indicator rod 88, of such as Lucite or other internal reflective material.

The indicator rod 88 has a relatively short lower end portion 90 which extends through and is secured in the clamp loop 66, and which terminates, at its lower end, in the angled light-receiving lower end 86 of the rod, which directly faces the bracket bulb 82. The lower end portion 90 of the rod 88 merges, at its upper end, into an intermediate portion 92, which is angled laterally outwardly, upwardly and forwardly, relative to the carrier bar 64, the intermediate portion 92 being long enough to reach to the vicinity of the outer side 14 of the related fender 10.

The intermediate indicator rod portion 92 merges, at its outer end, into a relatively long perpendicular upper portion 94, which is long enough so that the upper portion thereof reaches above the top of the fender, into the line of sight of the driver of the automobile. An ornamental and protective cap 96 is secured on the upper end of the indicator rod.

Installation of the indicator 44 requires only removal of the headlight rim 32, after backing out the screws 30, the placement of the crosshead 48 on the flange 38 of the head lamp 16, then looping the rim 32 over the indicator, and returning the rim to its normal position, with its hook flange 34 engaged against the front surface 56 of the head lamp flange 38, followed by replacing and tightening of the screws 30.

While, when either the low or the high beam of the head lamp 14 is on, a certain amount of light from the lamp reaches and illuminates the indicator rod 88, so that it can serve, to the driver of the automobile and to drivers of other automobiles, as a fender guide or clearance indicator, this limited amount of illumination of the rod 88 is deemed insufficient to provide the desired degree of information, to the driver of the automobile equipped with the device in question.

For more adequately illumining the indicator rod 88, during all times that the head lamp 16 is on high beam, the bracket lamp 78 is wired to be lit only while the head lamp is on high beam. For this purpose and as shown in FIGURE 4, the body 80 of the bracket bulb 78 is grounded to the automobile, through the bracket 64, while the ungrounded side of the bracket lamp is connected by a wire 98 to the high beam contact 24 of the head lamp socket 26.

The indicator rod 88 can be rotatably secured in the clamp loop 72, so the main upper portion of the indicator rod can be adjusted relative to the outer side of the related fender 10, so as to occupy the position required to act as a side clearance indicator or fender guide, and to increase its visibility to the driver of the automobile.

In FIGURES 6 and 7 another embodiment of the invention is shown, wherein a horizontal longitudinally elongated, end-lighted indicator rod 88a is shown, which has rearwardly and upwardly angled upper surface 100. The rod 88a lies upon the top of a front fender 10a, behind the related headlight 12a, and has, at its forward end, a forwardly and downwardly directed hook 102, which is engaged through a suitable opening 104, in the fender. A rearwardly extending ear 106, on the rear end of the indicator rod 88a, is traversed by a screw 108, which is threaded in the fender. A cavity 110, opening to the underside of the rod 88a, adjacent the rear end thereof, is registered with an opening 112, provided in the fender 10a, and a bulb socket 114, secured in the opening 112, holds an electric bulb 116, which projects upwardly into the cavity 110, for end-lighting the indicator rod 88a.

One side of the bulb socket 114 is grounded to the fender 10a, and its other side is connected by a wire 118, to the dimmer switch wire 24a, leading from the headlight 12a.

Obviously, operation of the device of FIGURES 6 and 7 is the same and of the same effect, as the operation and effect of the device in FIGURES 1 to 5, except that the rod 88a does not serve as in outboard fender guide.

What is claimed is:

1. The combination with a vehicle having a fender, said fender having a top and an outboard side, and a forepart, a headlight mounted on said forepart below the top and inboardly of the fender side, a vertical end-lighted member having an upper end extending above the top of the fender and positioned adjacent to the outboard side of the fender, bracket means supporting said member and secured to the headlight, said headlight comprising a head lamp having a peripheral flange, and a headlight rim secured to the fender, said rim having an outer edge engaged with the fender and an inner edge engaged with the front side of the lamp flange, said bracket being clamped between the inner edge of the rim and the lamp flange, said end-lighted member having a light-receiving lower end, and means producing end-lighting of said member while the head lamp is in operation, said means comprising an electric lamp mounted on the bracket and facing said light-receiving end of the member, and a reflector on said bracket facing the side of the lamp remote from the end-lighted member.

2. The combination with a vehicle having a fender, said fender having a top and an outboard side, and a forepart, a headlight mounted on said forepart below the top and inboardly of the fender side, a vertical end-lighted member having an upper end extending above the top of the fender and positioned adjacent to the outboard side of the fender, bracket means supporting said member and secured to the headlight, said headlight comprising a head lamp having a peripheral flange, and a headlight rim secured to the fender, said rim having an outer edge engaged with the fender and an inner edge engaged with the front side of the lamp flange, said bracket being clamped between the inner edge of the rim and the lamp flange, said end-lighted member having a light-receiving lower end, and means producing end-lighting of said member while the head lamp is in operation, said head lamp having low and high beam contacts, said means comprising an electric lamp mounted on the bracket and having one side thereof grounded to the fender and another side connected to the high beam contact, said end-lighted member being out of light receiving relation to the headlight.

3. In combination, a vehicle body, a headlight mounted on the body, said headlight comprising a head lamp, having a high beam element, a vertical end-lighted indicator rod having a light-receiving end, bracket means secured to the headlight and carrying said rod, an electric lamp mounted on the bracket means, said electric lamp having one side thereof grounded to the body and its other side connected to the high beam contact, said electric lamp having a bulb facing the light-receiving end of the indicator rod, said indicator rod being out of light receiving relation to the headlight.

4. The combination of claim 3, wherein said light-receiving end of the indicator rod is the lower end thereof.

5. The combination of claim 3, wherein said light-receiving end of the indicator rod is the lower end thereof, said lower end being angulated upwardly and toward the bulb.

6. A device of the character described, comprising mounting means adapted to be secured to the rim of a headlight, said mounting means comprising bracket means extending laterally from the headlight, an electric bulb secured to said mounting means and reaching below said bracket means, said bulb being adapted to be connected in circuit with the illuminating element of a headlight, a reflector secured to said mounting means and extending below said bracket means, an end-lighted rod secured to the bracket means and extending thereabove, said rod having a light receiving end facing one side of the electric bulb, said reflector being disposed at the side of the electric bulb remote from the light-receiving end of the said rod and positioned to reflect the light of the bulb to the light-receiving end of the rod.

References Cited

UNITED STATES PATENTS

| | | | |
|---|---|---|---|
| 2,050,981 | 8/1936 | Cohen | 240—8.1 |
| 2,113,919 | 4/1938 | Korematsu | 240—8.1 X |
| 2,481,321 | 9/1949 | Marcinik | 240—8.4 X |
| 2,672,841 | 3/1954 | Nitzberg | 240—8.4 X |
| 2,753,439 | 7/1956 | Greenfield | 116—28 X |
| 2,791,678 | 5/1957 | Ferman | 240—8.1 |
| 2,828,407 | 3/1958 | Thompson | 240—7.1 |

FOREIGN PATENTS 607,646   9/1948   Great Britain.

NORTON ANSHER, *Primary Examiner.*

D. L. JACOBSON, *Assistant Examiner.*